(12) United States Patent  
Liao et al.

(10) Patent No.: US 9,391,891 B2  
(45) Date of Patent: Jul. 12, 2016

(54) METHOD FOR ACCESSING INTERNET VIA A VEHICLE NETWORK

(71) Applicant: University of Electronic Science and Technology of China, Chengdu, Sichuan Province (CN)

(72) Inventors: Dan Liao, Chengdu (CN); Gang Sun, Chengdu (CN); Du Xu, Chengdu (CN); Hongfang Yu, Chengdu (CN); Bing Qiu, Chengdu (CN); Peng Zhao, Chengdu (CN)

(73) Assignee: University of Electronic Science and Technology of China, Chengdu, Sichuan (CN)

( * ) Notice: Subject to any disclaimer, the term of this patent is extended or adjusted under 35 U.S.C. 154(b) by 20 days.

(21) Appl. No.: 14/521,833

(22) Filed: Oct. 23, 2014

(65) Prior Publication Data

US 2015/0109962 A1    Apr. 23, 2015

(30) Foreign Application Priority Data

Oct. 23, 2013 (CN) .......................... 2013 1 0501023  
Aug. 6, 2014 (CN) .......................... 2014 1 0381979

(51) Int. Cl.
*H04L 12/28* (2006.01)  
*H04L 12/56* (2006.01)  
*H04L 12/715* (2013.01)  
*H04L 12/64* (2006.01)  
*H04L 29/12* (2006.01)

(52) U.S. Cl.
CPC .......... *H04L 45/741* (2013.01); *H04L 12/6418* (2013.01); *H04L 45/04* (2013.01); *H04L 61/2015* (2013.01); *H04L 61/2514* (2013.01)

(58) Field of Classification Search
CPC . H04L 12/56; H04L 2012/56; H04L 29/0653; H04L 29/06095; H04L 49/3009; H04L 49/309; H04L 45/74; H04L 2012/5667; H04L 49/606; H04L 29/06163; H04L 12/5601; H04L 45/50; H04L 45/741; H04L 61/2015; H04L 61/2514; H04L 45/04; H04L 12/63  
USPC .......... 370/389, 392, 395.52, 395.5, 401, 402  
See application file for complete search history.

(56) References Cited

U.S. PATENT DOCUMENTS

| | | | | |
|---|---|---|---|---|
| 8,612,531 | B2* | 12/2013 | Guo | H04L 65/605 701/409 |
| 9,036,509 | B1* | 5/2015 | Addepalli | H04W 4/046 370/259 |
| 9,135,612 | B1* | 9/2015 | Proctor, Jr. | G06Q 20/202 |
| 2006/0095585 | A1* | 5/2006 | Meijs | H04L 12/4633 709/245 |
| 2011/0144858 | A1 | 6/2011 | Yun et al. | |
| 2012/0120930 | A1 | 5/2012 | Ji et al. | |
| 2013/0204466 | A1 | 8/2013 | Ricci | |

* cited by examiner

*Primary Examiner* — Brenda H Pham  
(74) *Attorney, Agent, or Firm* — Vedder Price P.C.; Thomas J. Kowalski; Rebecca G. Rudich

(57) ABSTRACT

The present invention provides a method for accessing internet via a vehicle network. Vehicle terminal equipment can access OBU by means of the wireless AP on OBU, and realize the mutual communication with internet with the help of VANET network composed by OBU and RSU. Not only the normal communication between the OBU and RSU is guaranteed, but also the communication between vehicle terminal equipment and internet can be realized. Moreover, the present invention has the characteristics of anti-interference, convenience and real-time performance, and can adapt to the demand of the current network.

5 Claims, 6 Drawing Sheets

METHOD FOR ACCESSING INTERNET VIA A VEHICLE NETWORK

I. FIELD OF THE INVENTION

This application claims priorities under the Paris Convention to Chinese Patent Application No. 201310501023.6, Filed Oct. 23, 2013, and the Chinese Patent Application No. 201410381979.1, Filed Aug. 6, 2014, entirety of which is hereby incorporated by reference for all purposes as if fully set forth herein.

The present invention relates to the field of vehicle network, more particularly to a method for accessing internet via a vehicle network.

II. BACKGROUND OF THE INVENTION

Vehicle network is an vehicle mobile internet of things. It refers to a network system that uses vehicle electronic sensing equipments with the help of mobile communication technology, vehicle navigation systems, intelligent terminal equipment and information network platform to make the vehicle and road, vehicle and vehicle, vehicle and people, vehicle and city real-time networked, and realize information interconnection. Therefore, the vehicles, people, objects, roads can be effectively and intelligently monitored, scheduled and supervised. Through the radio frequency identification technology, Vehicle network can realize the vehicle digital managements, such as real-time tracking, vehicle operating conditions supervision and other regulatory. Just like the internet of things, the basis of vehicle network is sensor. So enhancing the sensor's operation is necessary. With the help of sensor, the traffic signal, camera, jam reports, weather conditions, and other information can be integrated together, thus, the interconnection of vehicles and roads is realized. And through the communication and cooperation between the road management deparimnt and the technical management department, vehicle network can realize the combination of vehicles, roads and people.

The nature of vehicle network is the integration of mobile internet and internet of things. Through the integration of various information and services concerning vehicles, roads and people, the vehicle network provide services for the people, including the people inside vehicle and the people who is concerning about. Therefore, those which want to get the information and services provided by vehicle network are not just the vehicle terminals, but all terminals that can access internet or mobile Internet. Thus computers and mobile phones are also the terminals of vehicle network. Most of conventional technologies and applications of internet or mobile internet can be used in vehicle network, including media entertainment, e-commerce, web2.0 application and information service. Comparing with internet and mobile internet, vehicle network has two key features: the first is that vehicle network relates to vehicle and road, and the second is that vehicle network regards the position information as a key element. Revolving around the two key features and developing more applications of vehicle network, we will bring a wider range of users of and service providers to vehicle network.

In prior art, Vehicle Ad-hoc Network (VANET) is a kind of Ad-hoc Network, which supports dynamic, random, multi-hop topology application in transportation field. VANET is also a special local network, meanwhile is a kind of special Mobile Ad-hoc Network (MANET). It not only has all the characteristics of traditional Ad-hoc Network, but also has the particularities of on-board wireless network, such as fast moving of network node, dynamic and rapidly changing of network topology, instability of wireless communication channel, narrow time of communication window between nodes. Different from the traditional Ad-hoc Networks, VANET is composed of On-Board Unit (OBU) and Roadside Unit (RSU). OBU mainly consists of positioning module, vehicle state parameter collecting module, vehicle and road communication module, vehicle and input-output device communication module. Vehicle communicates with the outside via OBU, and RSU is mainly charge of the communication between vehicle and fixed facilities. The network architecture of VANET is divided into two parts: one is the communication between vehicles, i.e. vehicle to vehicle communication; another is the communication between vehicle and fixed facilities (RSU), i.e. vehicle to infrastructure communication. However, VANET cannot satisfy the communication between vehicle and internet.

III. SUMMARY OF THE INVENTION

The present invention aims to overcome the deficiencies of prior art and provides a method for accessing internet via a vehicle network, so that the vehicle terminals can access internet via a VANET network, and moreover, the access is of anti-interference, convenience and real-time performance.

To achieve these objectives, in accordance with the present invention, a method for accessing internet via a vehicle network is provided, comprising the following steps:

(1). assigning a IPv4 address to a vehicle terminal equipment through the DHCP (Dynamic Host Configuration Protocol), wherein:

OBU (On-Board Unit) is configured as a DHCP server, and a static IPv4 address, a subnet mask and a default gateway are set up for it; when a vehicle terminal equipment apply to the DHCP server for a IPv4 address, DHCP server selects an IPv4 address which has not been used, from a set of IPv4 addresses for dynamic allocating; thus, different IPv4 address is assigned to different vehicle terminal equipment on OBU;

(2). sending a packet from the vehicle terminal equipment to internet;

2.1). a vehicle terminal equipment sends a IPv4 packet to OBU, OBU receives and processes the IPv4 packet, wherein: after receiving a IPv4 packet, OBU will inquire the destination address of the IPv4 packet to determine how to process the IPv4 packet, if the destination address is an external internet address, the IPv4 packet will be sent to and processed by Roadside Unit (RSU), if the destination address is an internal IPv4 address, i.e. an address of OBU, the IPv4 packet will be processed by the upper layer protocol of OBU, otherwise, the IPv4 packet will be discarded;

2.2). wherein, the destination address of the IPv4 packet is an external internet address, the IPv4 packet will be processed by tunnel technology in the IPv4 private network part of OBU: the IPv4 packet is sent to the private network part of OBU, then its corresponding layer header will be deleted, the remainder of the IPv4 packet is the IPv4 layer packet, and taken as an original IPv4 packet;

the original IPv4 packet will be sent to Vehicle Ad-hoc Network (VANET) private network part of OBU and encapsulated into UDP data portion in UDP layer of VANET private network part of OBU, and then, UDP header is added to the UPD data portion, thus a UDP packet is obtained; the UDP packet is sent to the IPv6 layer; the UDP packet will be submitted from higher layer to lower layer with encapsulating corresponding layer header in VANET private network part of OBU, and in the end, the UDP packet is sent out by the wireless network card which is working at Ad-hoc mode;

2.3). wherein, after receiving the UDP packet from OBU, RSU will process the UDP packet with tunnel technology in the private network part of RSU: the UDP packet will be submitted from lower layer to higher layer with deleting the corresponding layer header, in the end, the UDP packet is submitted to the UDP layer, and is processed according to the UDP data portion, if the UDP data portion is the original IPv4 packet, the UDP packet will be processed in the IPv4 private network part of RSU to take the original IPv4 packet out, otherwise submitted to application layer for further process; wherein, the original IPv4 packet will be added with MAC header to obtain an sending packet, the sending packet is submitted to the MAC layer;

the sending packet is sent to internet by Ethernet or other means after the Network Address Translation (NAT) transformation: NAT translates the private IPv4 address of sending packet into legitimate public IPv4 address, then sends the sending packet to internet, and records the transmission path information simultaneously;

(3). returning a packet from internet to the vehicle terminal equipment:

3.1). after receiving a packet from the vehicle terminal equipment, internet returns a packet, i.e. return packet to the vehicle terminal equipment; wherein the return packet from internet is transformed through NAT, NAT will find out the vehicle terminal equipment of the return packet via the transmission path information previously recorded, and translates the public IPv4 address of the return packet into the private IPv4 address;

3.2). RSU processes the return packet; wherein after receiving the return packet, RSU will process the return packet through inquiring the private IPv4 address of the return packet, if the private IPv4 address, i.e. destination address is a local IPv4 address of RSU, the return packet will be submitted to the transport layer to process, if the private IPv4 address is the private IPv4 address of OBU, then the return packet will be submitted to the private network part of RSU and sent to the OBU; otherwise, the return packet will be discarded;

3.3), wherein, when the private IPv4 address of the return packet is of OBU, the return packet will enter into the IPv4 private network part of RSU, and be processed with tunnel technology: the corresponding layer header of the return packet is deleted, the remainder of return packet is IPv4 layer packet, and taken as an original return IPv4 packet;

the original return IPv4 packet will be encapsulated into UDP data portion in UDP layer of VANET private network part of RSU, and then, a UDP header is added to the UPD data portion, thus a UDP packet is obtained; the UDP packet is sent to the IPv6 layer, the UDP packet will be submitted from higher layer to lower layer with encapsulating corresponding layer header in VANET private network part of RSU, and in the end, the UDP packet is sent out by the wireless network card which is working at Ad-hoc mode;

3.4). wherein, after receiving the UDP packet from RSU, OBU will process the UDP packet with tunnel technology in the private network part of OBU: the UDP packet will be submitted from lower layer to higher layer with deleting the corresponding layer header in VANET private network part of OBU, in the end, the UDP packet is submitted to the UDP layer of VANET private network part of OBU, and is processed according to the UDP data portion, if the UDP data portion is the packet returning from internet to vehicle terminal equipment, the UDP packet will be processed in the IPv4 private network part of OBU to take the original return IPv4 packet out, otherwise submitted to application layer for further process; wherein, the original return IPv4 packet will be added with MAC header to obtain a final return packet, the final return packet is submitted to the MAC layer, and sent to the vehicle terminal equipment by the wireless card of OBU which is working at AP mode.

wherein, the said tunnel technology is that: the data transmitted by tunnel can be a different protocol data frame or data packet, the tunnel protocol repackages the other protocol data frame or data packet, and send it out through tunnel, the encapsulated frame head contains routing information.

wherein the said NAT adopts the port multiplexing method to realize that all hosts in IPv4 private network can share a legitimate external IPv4 address.

The objectives of the present invention are realized as follows:

In accordance with the present invention, vehicle terminal equipment can access OBU by means of the wireless AP on OBU, and realize the mutual communication with internet with the help of VANET network composed by OBU and RSU. Not only the normal communication between OBU and RSU is guaranteed, but also the communication between vehicle terminal equipment and internet can be realized. Moreover, the present invention has the characteristics of anti-interference, convenience and real-time performance, and can adapt to the demand of the current network.

Meanwhile, the present invention has several beneficial effects as follows:

(1). Strong anti-interference; The vehicle terminal equipment accesses OBU by means of the wireless AP on OBU, and the mutual communication between the vehicle terminal and internet is realized with the help of the VANET network composed by OBU and RSU. As long as the normal communication between the OBU and RSU is guaranteed, the vehicle terminal equipment will be able to maintain the normal communication with the internet and not affected by the surrounding environment.

(2). Convenience; Through VANET network, the users of vehicle terminal equipment can access internet and browse all kinds of goods promotion, entertainment, leisure, tourist attractions information etc. users can know all kinds of information nearby in the vehicle, which provides great convenience for the user in choosing travel options.

(3). Real-time performance; During the rush hour, it is easy to cause traffic jams. Through VANET network, the users of vehicle terminal equipment can access internet in real time and know the traffic of the road ahead, or through VANET network, receives the road traffic broadcast from internet. With the help of broadcast, users can choose the route in advanced, and that effectively alleviates the traffic jams.

IV. BRIEF DESCRIPTION OF THE DRAWING

The above and other objectives, features and advantages of the present invention will be more apparent from the following detailed description taken in conjunction with the accompanying drawings, in which.

V. DETAILED DESCRIPTION OF THE PREFERRED EMBODIMENT

Figure 1:
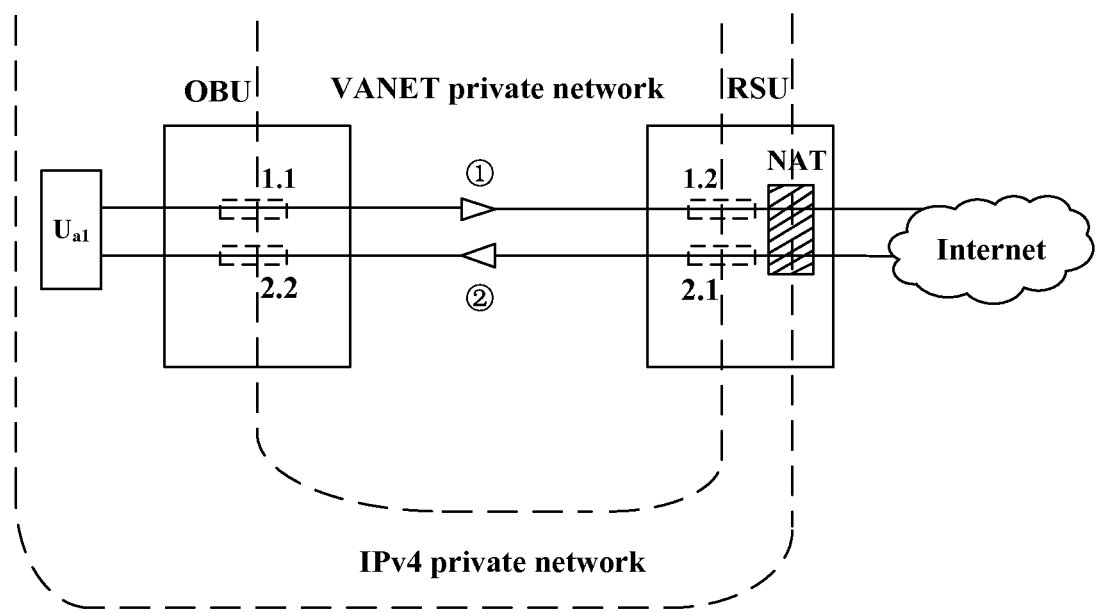
FIG. 1 is a diagram of the network architecture according to one embodiment of the present invention.

Hereinafter, preferred embodiments of the present invention will be described with reference to the accompanying drawings. It should be noted that the similar modules are designated by similar reference numerals although they are illustrated in different drawings. Also, in the following description, a detailed description of known functions and configurations incorporated herein will be omitted when it may obscure the subject matter of the present invention.

Embodiment 1

For convenience of description, the terminologies related to the embodiment will be described as follows:
MAC: Medium Access Control;
VANET: Vehicle Ad-hoc Network;
MANET: Mobile Ad-hoc Network;
DHCP: Dynamic Host Configuration Protocol;
OBU: On-Board Unit;
RSU: Roadside Unit;
AP mode: Wireless network bridges to wired network through access point and all wireless communications are completed via the access point;
Ad-hoc mode: Referring to a set of wireless devices communicate with each other directly without using the access point;
NAT: Network Address Translation.

FIG. 1 is a diagram of the network architecture according to one embodiment of the present invention.

In one embodiment, as show in FIG. 1, the whole network is logically divided into internet, IPv4 private network and VANET private network. Communication process ① and ② denote that IPv4 private network internal node i.e. vehicle terminal equipment $U_{a1}$ sends a packet to external internet and external internet returns a packet to IPv4 private network internal node $U_{a1}$ respectively.

OBU (On-Board Unit) is configured as a DHCP server. And a static IPv4 address, a subnet mask and a default gateway are set up for it. When a vehicle terminal equipment apply to the DHCP server for a IPv4 address, DHCP server selects an IPv4 address which has not been used, from a set of IPv4 addresses for dynamic allocating. Thus, different IPv4 address is assigned to different vehicle terminal equipment on OBU.

The vehicle terminal equipment sends a packet to internet: vehicle terminal equipment sends a IPv4 packet to OBU. After receiving the IPv4 packet, OBU will inquire the destination address of the IPv4 packet to determine how to process the IPv4 packet. If the destination address is an external internet address, the IPv4 packet will be sent to and processed by Roadside Unit (RSU); if the destination address is an internal IPv4 address, i.e. an address of OBU, the IPv4 packet will be processed by the upper layer protocol of OBU, otherwise, the IPv4 packet will be discarded. When the destination address of the IPv4 packet is an external internet address, the IPv4 packet will be sent to OBU and encapsulated, and in the end, sent out by the wireless network card which is working at Ad-hoc mode. When RSU receives the packet from OBU, the packet will be de-encapsulation and sent out by Ethernet or other way. Eventually the sending packet are transformed by NAT and sent to the internet.

Internet returns a packet to the vehicle terminal equipment: After receiving a packet from the vehicle terminal equipment, internet returns a corresponding packet, i.e. return packet to the terminal equipment. The return packet from internet is transformed through NAT, NAT will find out the vehicle terminal equipment of the return packet via the transmission path information previously recorded, and translates the public IPv4 address of the return packet into the private IPv4 address. After receiving the return packet, RSU will process the return packet through inquiring the private IPv4 address of the return packet, if the private IPv4 address, i.e. destination address is a local IPv4 address of RSU, the return packet will be submitted to the transport layer to process, if the private IPv4 address is the private IPv4 address of OBU, then the return packet will be submitted to the private network part of RSU and sent to the OBU; otherwise, the return packet will be discarded. When the private IPv4 address of the return packet is of OBU, the return packet will enter into the IPv4 private network part of RSU, and be encapsulated, and in the end, sent out by the wireless network card which is working at Ad-hoc mode. When OBU receives the return packet from RSU, the return packet will be de-encapsulation and sent to vehicle terminal equipment by the wireless network card which is working at AP mode.

Figure 2:
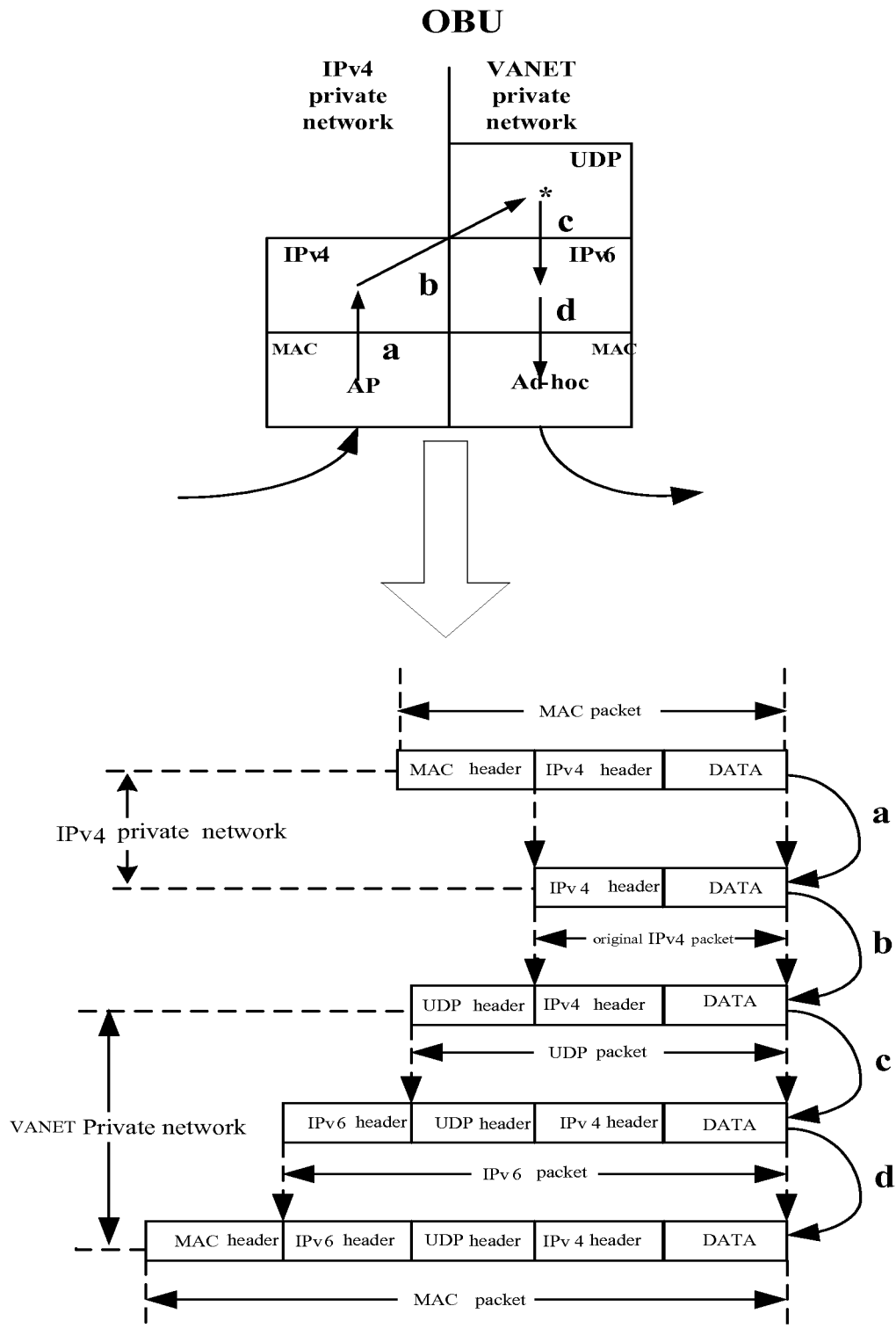
FIG. 2 is a flow chart of encapsulation of a packet received by OBU in FIG. 1 and sent to internet according to one embodiment of the present invention.

FIG. 2 is a flow chart of encapsulation of a packet received by OBU in FIG. 1 and sent to internet according to one embodiment of the present invention.

As shown in FIG. 2, a vehicle terminal equipment sends a MAC packet to OBU, and OBU receives the MAC packet, i.e. the IPv4 packet in the MAC layer of the IPv4 private network part of OBU by means of the wireless AP on OBU. Then the MAC packet is forwarded to the IPv4 layer of the IPv4 private network part of OBU with deleting the MAC header, which is shown as arrow line a. And the remainder of MAC packet, i.e. the IPv4 packet is the IPv4 layer packet, and taken as an original IPv4 packet. The original IPv4 packet is sent to VANET private network part of OBU and encapsulated into UDP data portion in UDP layer of VANET private network part of OBU, and then, UDP header is added to the UPD data portion, thus a UDP packet is obtained, which is shown as arrow line b. The UDP packet is sent to the IPv6 layer, the UDP packet will be submitted from higher layer to lower layer with encapsulating corresponding layer header in VANET private network part of OBU. UDP packet is encapsulated with IPv6 header, thus a IPv6 packet is obtained, and sent to IPv6 layer, which is shown as arrow line c; The IPv6 packet is encapsulated with MAC header, thus a MAC packet is obtained, and sent to MAC layer, which is shown as arrow line d. In the end, the UDP packet is sent out as a MAC packet by the wireless network card which is working at Ad-hoc mode.

Figure 3:
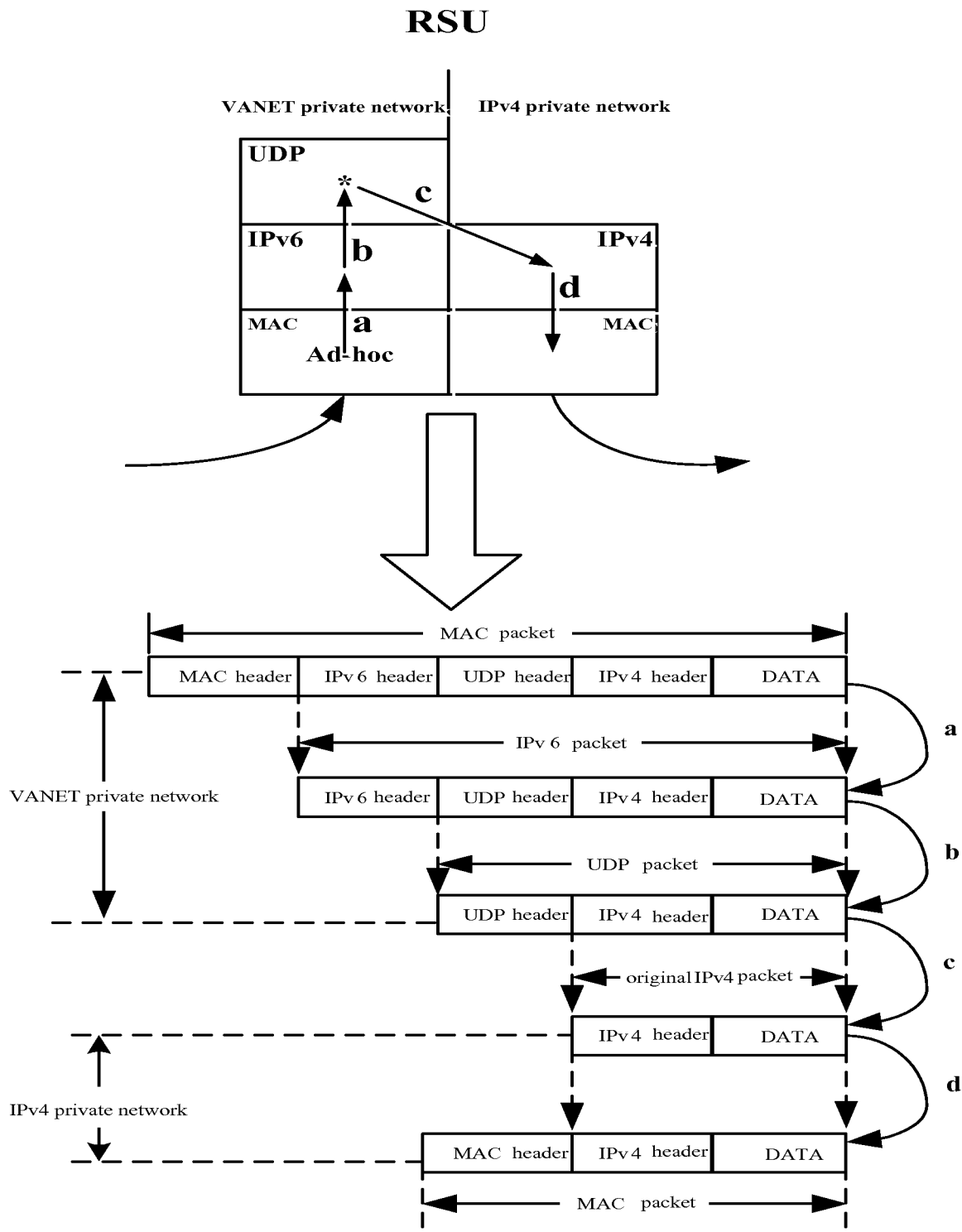
FIG. 3 is a flow chart of de-encapsulation of a packet received by RSU in FIG. 1 and sent to internet according to one embodiment of the present invention.

FIG. 3 is a flow chart of de-encapsulation of a packet received by RSU in FIG. 1 and sent to internet according to one embodiment of the present invention.

As shown in FIG. 3, after receiving the UDP packet (MAC packet) from OBU, RSU will process the UDP packet in the private network part of RSU: the UDP packet will be submitted from lower layer to higher layer with deleting the corresponding layer header, i.e. deleting MAC header and IPv6 header successively, which are shown as arrow line a and arrow line b. In the end, the UDP packet is submitted to the UDP layer of VANET private network part of RSU, and is processed according to the UDP data portion, if the UDP data portion is the original IPv4 packet, the UDP packet will be processed in the IPv4 private network part of RSU to take the original IPv4 packet out, which is shown as arrow line c, otherwise submitted to application layer for further process; wherein, the original IPv4 packet will be added with MAC header to obtain an sending packet, the sending packet is submitted to the MAC layer, which is shown as arrow line d. The sending packet is sent to the internet by Ethernet or other means after the Network Address Translation (NAT) transformation.

Figure 4:
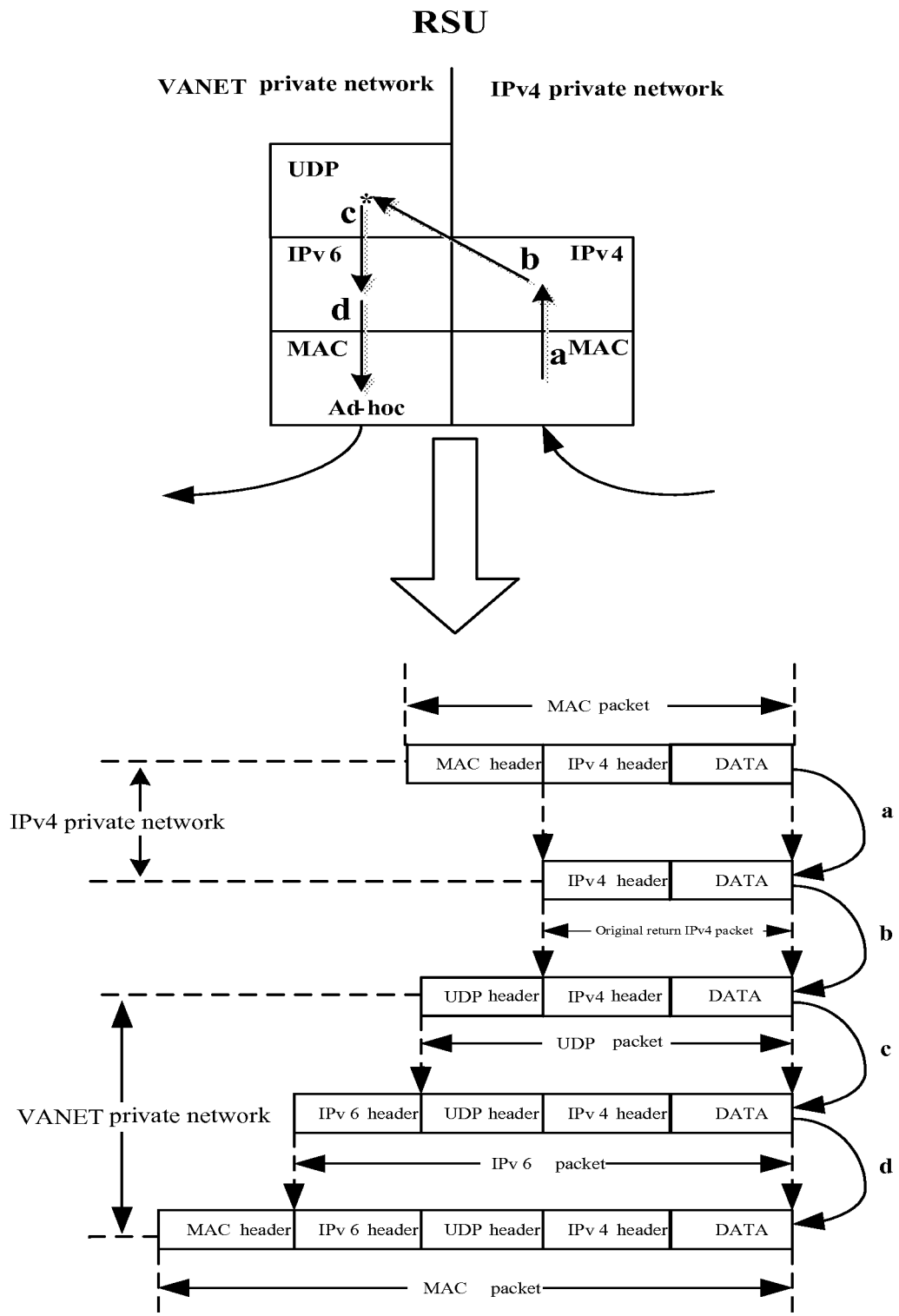
FIG. 4 is a flow chart of encapsulation of a packet received by RSU in FIG. 1 and returned to vehicle terminal equipment according to one embodiment of the present invention.

FIG. 4 is a flow chart of encapsulation of a packet received by RSU in FIG. 1 and returned to vehicle terminal equipment according to one embodiment of the present invention.

As shown in FIG. 4, when the destination IPv4 address of the return packet that RSU receives is the private IPv4 address of OBU, the return packet, i.e. a Mac packet will enter into the MAC layer of the IPv4 private network part of RSU. The corresponding layer header, i.e. MAC header of the return packet is deleted, the remainder of return packet is IPv4 layer packet, and taken as an original return IPv4 packet, which is shown as arrow line a. The original return IPv4 packet will be encapsulated into UDP data portion in UDP layer of VANET private network part of RSU, and then, a UDP header is added to the UPD data portion, thus a UDP packet is obtained and sent to the UDP layer of VANET private network part of RSU, which is shown as arrow line b. The UDP packet will be submitted from higher layer to lower layer with encapsulating corresponding layer header in VANET private network part of RSU, UDP packet is encapsulated with IPv6 header, thus an IPv6 packet is obtained, and sent to IPv6 layer, which is shown as arrow line c; The IPv6 packet is encapsulated with MAC header, thus a MAC packet is obtained, and sent to MAC layer, which is shown as arrow line d. In the end, the UDP packet is sent out as a MAC packet by the wireless network card which is working at Ad-hoc mode.

Figure 5:
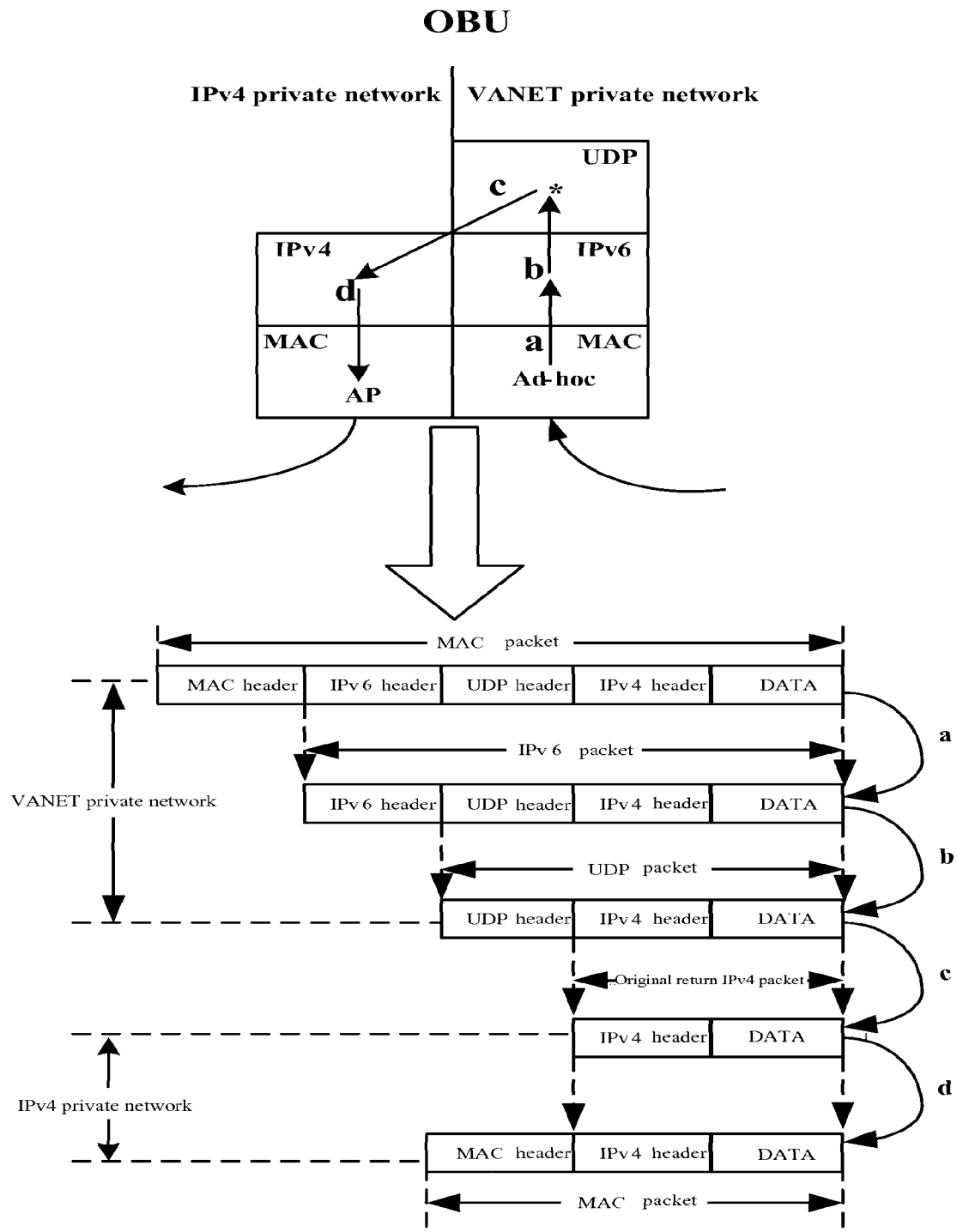
FIG. 5 is a flow chart of de-encapsulation of a packet received by OBU in FIG. 1 and returned to vehicle terminal equipment according to one embodiment of the present invention.

FIG. 5 is a flow chart of de-encapsulation of a packet received by OBU in FIG. 1 and returned to vehicle terminal equipment according to one embodiment of the present invention.

As shown in FIG. 5, after receiving the UDP packet from RSU, OBU will process the UDP packet in the private network part of OBU. The UDP packet will be submitted from lower layer to higher layer with deleting the corresponding layer header in VANET private network part of OBU, i.e. deleting MAC header and IPv6 header successively, which are shown as arrow line a and arrow line b. In the end, the UDP packet is submitted to the UDP layer of VANET private network part of OBU, and is processed according to the UDP data portion, if the UDP data portion is the packet returning from internet to vehicle terminal equipment, the UDP packet will be processed in the IPv4 private network part of OBU to take the original return IPv4 packet out, which is shown as arrow line c, Otherwise submitted to application layer for further process; wherein, the original return IPv4 packet will be added with MAC header to obtain a final return packet, the final return packet is submitted to the MAC layer, which is shown as arrow line d, and sent to the vehicle terminal equipment by the wireless card of OBU which is working at AP mode.

Figure 6:
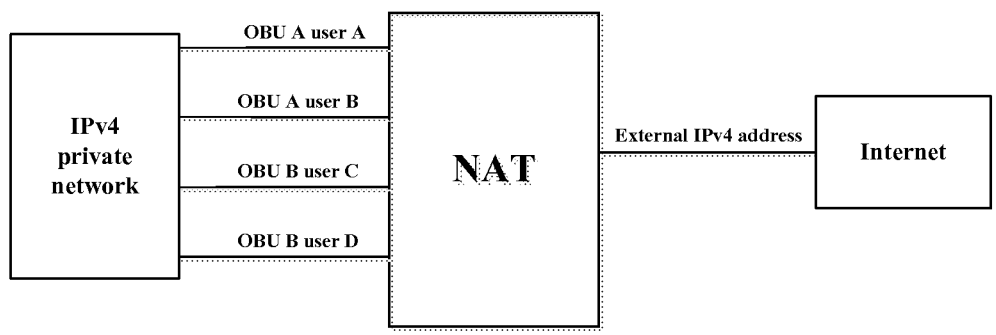
FIG. 6 is a diagram of translating private IPv4 address into legitimate public IPv4 address of NAT according to one embodiment of the present invention.

FIG. 6 is a diagram of translating private IPv4 address into legitimate public IPv4 address of NAT according to one embodiment of the present invention.

Each user, i.e. vehicle terminal equipment on OBU can be assigned an IPv4 address through the DHCP server, a different IPv4 address is assigned to different vehicle terminal equipment on OBU. However, the addresses assigned to a vehicle terminal equipment on OBU is private network address, so the addresses assigned to vehicle terminal equipments on different OBUs may be the same or different. As shown in FIG. 6, user A and user B on the OBU A have different addresses. User C and user D on the OBU B have different addresses as well. However, user A(B) on OBU A and user C(D) on OBU B may have the same address or not. NAT adopts the port multiplexing method to realize that all hosts in IPv4 private network can share a legitimate external IPv4 address.

Embodiment 2

One of the most popular technologies in the field of ITS (Intelligent Transport System) is the Wireless Access in Vehicular Environments (WAVE) protocol, which is led by the U.S. Department of Transportation, and developed by the IEEE. In order to meet demand for vehicle network communications, IEEE developed and designed the WAVE protocol stack, which is composed of IEEE802.11p and IEEE1609.

WAVE 1609 protocol has two ways to transfer data in the data plane—IPv6 protocol and WSMP protocol. IPv6 protocol is the next-generation IP designed by IETF, which will replace the current version of the IP, i.e. IPv4 protocol. IPv6 protocol complies with IETF RFC 2460 standard. However, in the WAVE protocol, the parameters of IPv6 are configured by the system administrator or by the WME (WAVE Management Entity) according to the information from the WSA (WAVE Service Advertisement), which makes IPv6 not support routing function, so the packets must be single-hop reachable.

There are six service channel (SCH) and a control channel (CCH) in WAVE1609 protocol definition. The standard points out that the default action of WAVE device is to switch alternately CCH and SCH. A period is 100 ms as cycle, in which the channel firstly switches to CCH in 50 ms and then switches to SCH in 50 ms. The CCH is mainly used to transfer the management information, including WSA, while SCH is mainly used in transmitting the service information. The packets of IPv6 protocol can be only transmitted in the SCH.

In one embodiment, in VANET private network, the UPD packet is added a Forward Control Character (FCC), which comprises of Forward Flags (FF) and Forward Hop Limit (FHL), wherein, FF is used to identify whether the UPD packet need Multi-Hop forward, FHL refers to the total number of UPD packet can be forwarded in VANET, when the UPD packet is forwarded, it will minus 1; the UPD packet will be forwarded in VANET, until its FHL is zero; when a vehicle in VANET private network receive a the UPD packet, it will check the FCC, if the FF is "forwarded forcibly", and FHL is not zero, the UPD packet will be forwarded. Thus the multi-hop is realized.

While illustrative embodiments of the invention have been described above, it is, of course, understand that various modifications will be apparent to those of ordinary skill in the art. Such modifications are within the spirit and scope of the invention, which is limited and defined only by the appended claims.

What is claimed is:

1. A method for accessing internet via a vehicle network including an on-board unit (OBU) configured as a Dynamic Host Configuration Protocol (DHCP) server, a roadside unit (RSU) and a Vehicle Ad-Hoc Network (VANET), the OBU having a VANET private network part, comprising the following steps:

assigning an IPv4 address to a vehicle terminal equipment through DHCP, the steps of assigning the IPv4 address comprising:

providing a static IPv4 address, a subnet mask and a default gateway for the OBU;

when the vehicle terminal equipment applies to the DHCP server for an IPv4 address, DHCP server selecting an unused IPv4 address from a set of IPv4 addresses for dynamic allocating such that a different IPv4 address is assigned to different vehicle terminal equipment;

sending a packet from the vehicle terminal equipment to the Internet, the steps comprising:

the vehicle terminal equipment sending an IPv4 packet to the OBU such that the OBU receives and processes the IPv4 packet;

after receiving an IPv4 packet, the OBU inquiring the destination address of the IPv4 packet to determine how to process the IPv4 packet, such that wherein, if the destination address is an external internet address, the IPv4 packet is sent to and processed by the RSU, and if the destination address is an internal IPv4 address the IPv4 packet is processed by an upper layer protocol of the OBU, if the destination address is not identified as one of an external internet address and an internal IPv4 address, the IPv4 packet is discarded;

wherein, if the destination address of the IPv4 packet is an external internet address, the IPv4 packet is processed by tunnel technology in a IPv4 private network part of OBU such that the IPv4 packet is sent to the private network part of OBU, a corresponding layer header of the IPv4 packet is deleted such that a remainder of the IPv4 packet, is an IPv4 layer packet taken as an original IPv4 packet, including sending the original IPv4 packet to the VANET private network part of the OBU and encapsulating the original IPv4 packet into a User Diagram Protocol (UDP) data portion in a UDP layer of the VANET private network part of the OBU; adding a UDP header to the UDP data portion such that a UDP packet is obtained; sending the UDP packet to an IPv6 layer such that the UDP packet is submitted from a higher layer to a lower layer and encapsulating a corresponding layer header in the VANET private network part of the OBU, and sending the UDP packet by a wireless network card working in Ad-hoc mode;

after receiving the UDP packet from the OBU, the RSU processing the UDP packet with tunnel technology in a private network part of the RSU, such that the UDP packet is submitted from a lower layer to a higher layer with deleting a corresponding layer header and the UDP packet is submitted to the UDP layer and is processed according to the UDP data portion such that, if the UDP data portion is the original IPv4 packet, the UDP packet is processed in the IPv4 private network part of the RSU to remove the original IPv4 packet, and is otherwise submitted to application layer for further processing; wherein, the original IPv4 packet is added with a MAC header to obtain a sending packet and the sending packet is submitted to a MAC layer;

sending the sending packet to the Internet after the Network Address Translation (NAT) transformation such that NAT translates the private IPv4 address of the sending packet into a legitimate public IPv4 address and sends the sending packet to the Internet and records the transmission path information simultaneously;

returning a packet from internet to the vehicle terminal equipment, comprising the steps of:

after receiving a packet from the vehicle terminal equipment, the Internet returning a return packet, wherein the return packet is transformed through NAT, whereby NAT will find out the vehicle terminal equipment of the return packet via a previously recorded transmission path information, and translates the public IPv4 address of the return packet into a the private IPv4 address;

the RSU processing the return packet; wherein after receiving the return packet, the RSU processes the return packet through inquiring the private IPv4 address of the return packet, if the private IPv4 address is a local IPv4 address of the RSU, the return packet is submitted to the transport layer to process, if the private IPv4 address is the private IPv4 address of the OBU, then the return packet is submitted to the private network part of the RSU and sent to the OBU; otherwise, the return packet is discarded;

wherein, if the private IPv4 address of the return packet is of the OBU, the return packet enters into the IPv4 private network part of the RSU and is processed with tunnel technology, the corresponding layer header of the return packet is deleted, such that a remainder of return packet is an IPv4 layer packet taken as an original return IPv4 packet;

encapsulating the original return IPv4 packet into the UDP data portion in the UDP layer of VANET private network part of the RSU, and then, adding a UDP header to the UPD data portion to obtain a UDP packet; sending the UDP packet to the IPv6 layer, submitting the UDP packet from a higher layer to a lower layer and encapsulating a corresponding layer header in VANET private network part of the RSU, and sending the UDP packet out by the wireless network card working in Ad-hoc mode;

after receiving the UDP packet from the RSU, the OBU processing the UDP packet with tunnel technology in the private network part of the OBU; submitting the UDP packet from a lower layer to a higher layer and deleting the corresponding layer header in the VANET private network part of the OBU, and submitting the UDP packet to the UDP layer of the VANET private network part of the OBU, and processing the UDP packet according to the UDP data portion, such that, if the UDP data portion is the packet returning from Internet to the vehicle terminal equipment, processing the UDP packet in the IPv4 private network part of OBU to remove the original return IPv4 packet, and otherwise submitting the UDP packet to an application layer for further processing; adding the original return IPv4 packet with a MAC header to obtain a final return packet, submitting the final return packet to the MAC layer, and sending the final return packet to the vehicle terminal equipment by the wireless card of the OBU working in Ad Hoc mode.

2. The method for accessing Internet via a vehicle network of claim 1, wherein, the said tunnel technology includes: the data transmitted by tunnel by a different protocol data frame or data packet, the tunnel protocol repackages the other protocol data frame or data packet, and send it out through tunnel, wherein the encapsulated frame head contains routing information.

3. The method for accessing internet via a vehicle network of claim 1, wherein, the NAT adopts the port multiplexing method to realize that all hosts in IPv4 private network share a legitimate external IPv4 address.

4. The method for method for accessing internet via a vehicle network of claim 1, wherein the IPv4 packet is a MAC packet, and corresponding layer header of the IPv4 packet is MAC layer header; the encapsulating corresponding layer header includes encapsulating the UDP packet with an IPv6 header to obtain an IPv6 packet, and sending the IPv6 packet to IPv6 layer; encapsulating the IPv6 packet with MAC header to obtain a MAC packet and sending the MAC packet to MAC layer.

5. The method for accessing internet via a vehicle network of claim 1, wherein, in VANET private network, a Forward Control Character (FCC) is added to the UDP packet, wherein the FCC includes Forward Flags (FF) and Forward Hop Limit (FHL), wherein, FF identifies whether the UPD packet needs Multi-Hop forward, FHL refers to the total number of UPD packet can be forwarded in the VANET, such that when the UPD packet is forwarded, one (1) will de decremented from the FHL and the UPD packet will be forwarded in the VANET, until the FHL of the UDP packet is zero; and when a vehicle in VANET private network receive a the UPD packet, the FCC is checked such that, if the FF is "forwarded forcibly," and the FHL is not zero, the UPD packet is forwarded.

\* \* \* \* \*